METHOD OF TRANSMITTING MESSAGE SIGNALS THROUGH A CLOCK PULSE CHANNEL IN A DATA TRANSMISSION SYSTEM
Filed Feb. 8, 1966 4 Sheets-Sheet 1

INVENTOR.
Walter Herbert Erwin Widl
BY Hane and Nydick
Attorneys

INVENTOR.
Walter Herbert Erwin Widl
BY Hane and Nydick
Attorneys

INVENTOR
Walter Herbert Erwin Widl
BY Hane and Nydick
Attorneys

INVENTOR.
WALTER HERBERT ERWIN WIDL
BY Hane and Nydick
ATTORNEYS

United States Patent Office 3,461,239
Patented Aug. 12, 1969

3,461,239

METHOD OF TRANSMITTING MESSAGE SIGNALS THROUGH A CLOCK PULSE CHANNEL IN A DATA TRANSMISSION SYSTEM

Walter Herbert Erwin Widl, Bandhagen, Sweden, assignor to Telefonaktiebolaget L M Ericsson, Stockholm, Sweden, a corporation of Sweden Filed Feb. 8, 1966, Ser. No. 525,967
Claims priority, application Sweden, Mar. 11, 1965, 3,158/65
Int. Cl. H04l 7/04, 5/22
U.S. Cl. 178—69.5 8 Claims

ABSTRACT OF THE DISCLOSURE

A multiple-channel data transmission system for transmitting data from a transmitter to a receiver has a clock pulse channel transmitting clock pulses for synchronizing a clock device in the receiver with a clock device in the transmitter, the clock device in the receiver sampling clock pulse signals in the data transmission signals. The clock pulse signals are also used for transmitting data and further for preventing that the clock device in the receiver falls out of synchronism with the clock pulse signals when the clock pulse signals are modulated by data signals.

The present invention refers to a method of using a clock pulse channel for transmitting message signals in a parallel data transmission system, said clock pulse channel normally transmitting clock pulses only in order to synchronize a clock in the transmitter with a clock in the receiver said latter clock sensing the signal elements in the data transmission signals.

In a parallel data transmission equipment working with a number of channels binary data are supplied on the transmitter side to each data channel in the form of direct voltage levels, the direct voltages are by means of modulation converted into voice frequency signals which have a binary spectrum suitable for the transmission and on the receiver side the voice frequency signals are again converted into binary data, the occurring direct voltages being regenerated by means of sensing in step with the speed of modulation. This requires the transmission of a clock pulse information which is carried out through a particular clock pulse channel.

The basic ideal of the invention is to use said clock pulse signal also for the transmission of message signals and simultaneously for preventing that the clock on the receiver side falls out of synchronism when the clock pulse signal is modulated by a message signal.

The method according to the invention is characterized thereby that the clock pulse signal is modulated on the sender side by means of 180° phase shift modulation with the half clock pulse frequency in order to obtain on the receiver side a message signal in the form of a clock pulse signal of double duration. The incoming clock pulse signal is sensed in order to regenerate the message signal and is modulated by means of a signal that is generated by the clock of the receiver. This signal has the same frequency as the normal clock signal but is 90° out of phase in relation to the same, so that the signal obtained by means of the modulation alternates twice as rapidly as the incoming clock signal, the signal obtained by the modulation being integrated in order to obtain a direct voltage, the value of which increases and decreases respectively in proportion to the length of the positive and the negative signal elements respectively in the signal obtained by modulation. The integrated signal is supplied to the clock of the receiver the frequency of which is proportional to the direct voltage level obtained from the integrator, the voltage of the integrated signal being held within a determined voltage range on both sides of the direct voltage value corresponding to the synchronism of the clock in order to prevent the clock to fall out of synchronism by the increase and decrease respectively of the integrated voltage appearing as a result of the message signal.

Figure 1:
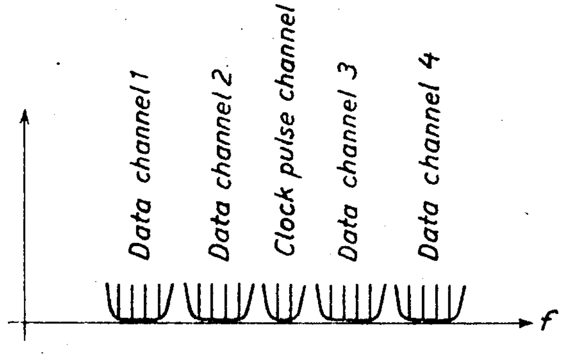
Figures 2A, 2B, 2C, 2D:
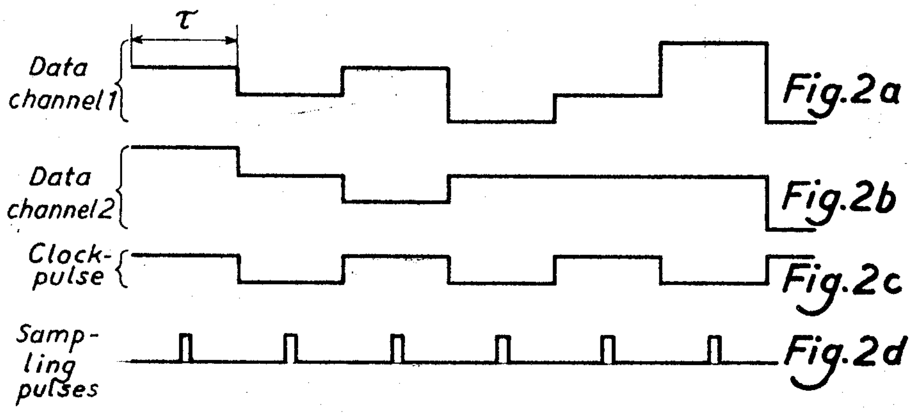
Figure 3:
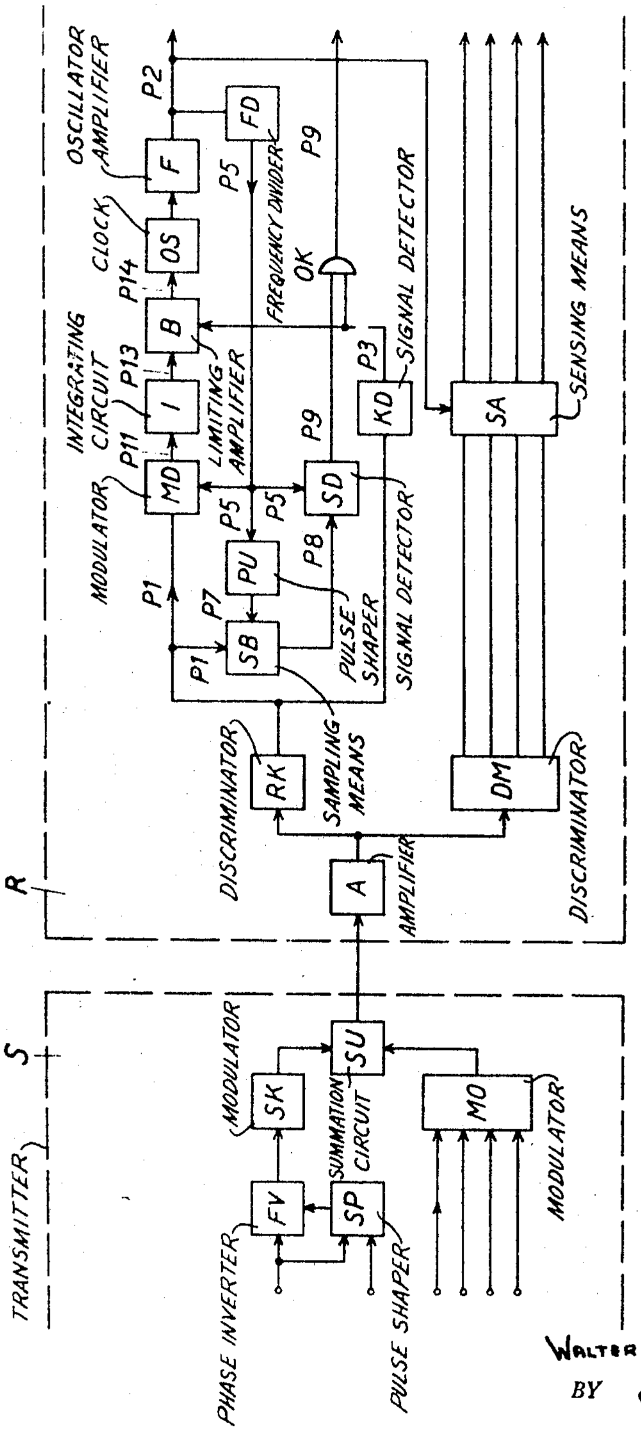
Figure 4:
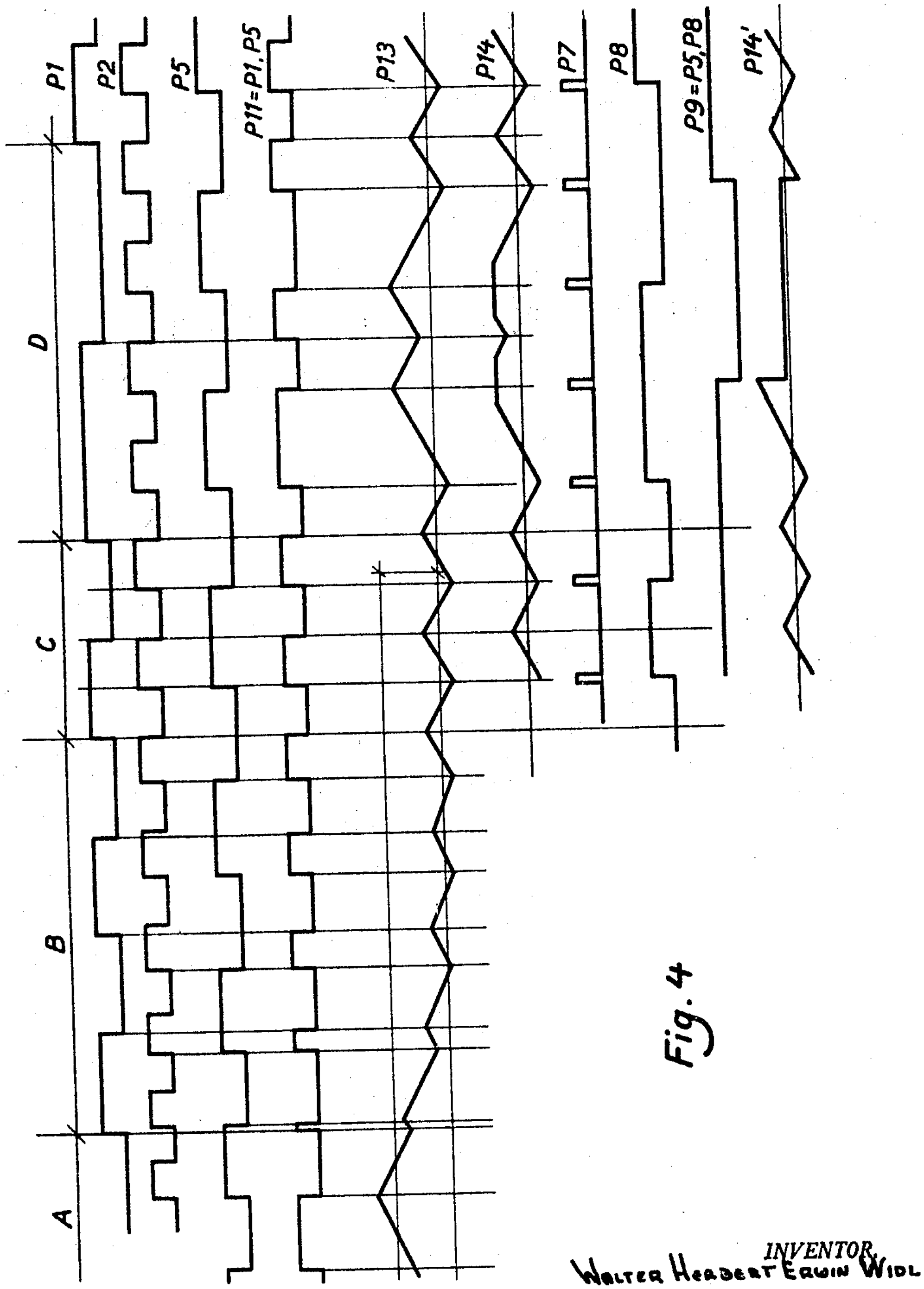
Figure 5:
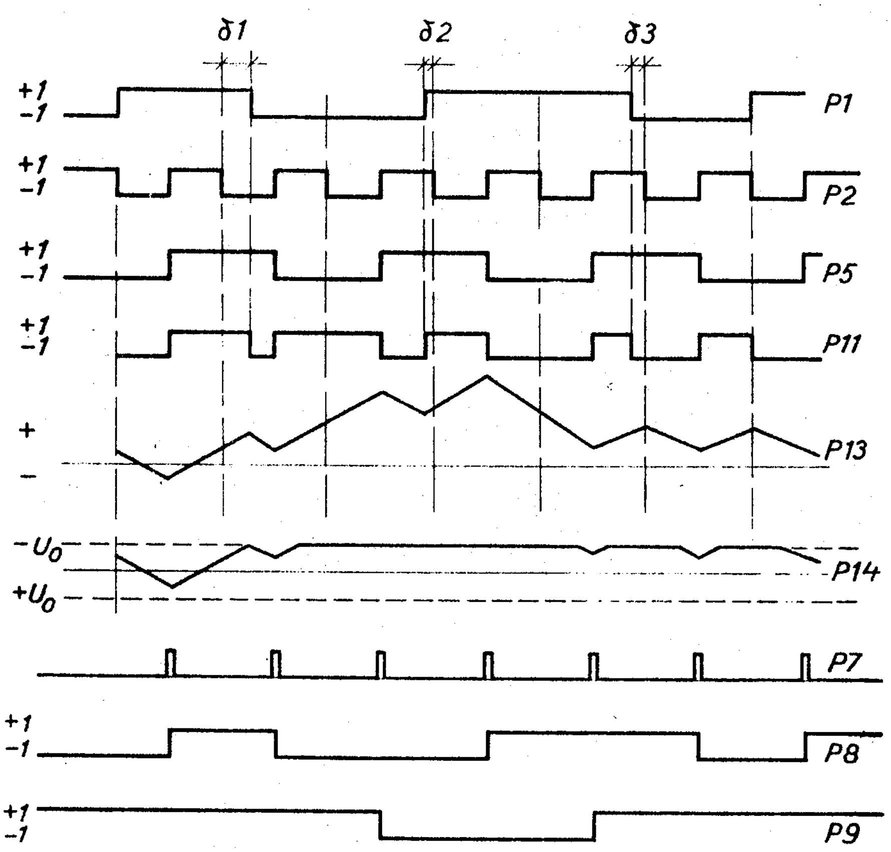

The invention is explained herebelow more in detail by means of an embodiment with reference to the enclosed drawing in which FIG. 1 shows an example for the distribution of the data channels and the clock pulse channel in the frequency spectrum of a parallel data transmission system, FIG. 2*a–d* shows the level variations in two of the data channels and in the clock pulse channel and also the sampling pulses as a function of time, FIG. 3 shows in the form of a block diagram a data transmission system in which transmitters and receivers are provided with means for the transmission of signal information throuh the clock pulse channel according to the invention, FIG. 4 shows the synchronizing process, the signals after the synchronization and the receiving of a message signal through the clock pulse channel, and FIG. 5 shows the receiving of a message signal through the clock pulse channel when pulse distortion is existing.

FIG. 1 shows the position of four parallel data transmission channels and a clock pulse channel in the frequency spectrum of a data transmission system which channels each transmit data signals consisting of four different frequencies and which consequently in the frequency spectrum require twice the band width of the clock pulse channel through which clock pulse information is transferred by means of only two frequencies.

FIG. 2*a* and FIG. 2*b* show the changes of level obtained by means of the frequencies in data channels 1 and 2 whereas FIG. 2*c* shows the changes in level obtained through the clock pulse channel. FIG. 2*d* shows the sampling pulses obtained by the changes in level of the clock pulse channel and which are used for sensing the voltage levels in the center of each signal element in the respective data channel.

FIG. 3 shows a data transmission system comprising a transmitter S and a receiver R and provided with equipment for transmitting control signals through the clock pulse channel, said control signals controlling the clock of the receiver. The clock pulses are frequency modulated in a modulator SK and the data signals are frequency modulated in a modulator MO. The modulated signals are supplied through a summation circuit SU to the line so as to be transmitted to the receiver R where the signals are amplified in the amplifier A. The clock signals are separated from the data signals by means of a discriminator RK and the individual data signals are separated by means of a discriminator DM. The data signals are supplied to a sensing means SA where they are sensed in step with the signals obtained from the clock OS. The system as described hereinbefore is commonly known for parallel data transmission and does not constitute the object of the invention.

If an information is sent through the clock pulse channel, signals are supplied to a pulse shaper SP which in step with the clock pulse forms the signal to a voltage that operates a phase inverter FV inserted in the clock pulse channel in such a way that during a time period corresponding to one or more signal elements a level reversal is obtained on the output of the phase inverter. The level reversal may be considered as an 180° phase modulation of a square wave by means of a fundamental frequency corresponding to half the modulation frequency.

The function of the receiver is explained in connection with FIG. 4 which shows a time process of the signals divided into four different sections. Of these sections section A shows the signal process before the synchronization, section B the synchronizing process itself, section C shows the process after the synchronization without receiving any message signal in the clock pulse channel and section D shows the process upon receiving a message signal in the clock pulse channel. Considering first the section C, that is, when the synchronization is already carried out and when from the output of the amplifier F a correct clock signal P2 is obtained. This signal is supplied to a frequency divider FD that generates a square signal P5 with half of the clock pulse frequency. The signals P5 have consequently the same frequency as the clock pulses arriving through the clock pulse channel but the division of the frequency is carried out in such a way that the signals P5 are 90° out of phase in relation to the incoming clock pulses. The signals P5 are supplied to a modulator MD where they modulate the clock signals P1 incoming to the receiver whereby the signal $P11=P1 \cdot P5$ is obtained. This signal is supplied to an integrating circuit I that produces on its output a signal P13 in the form of a direct voltage which increases during the positive period of the signal P11 and decreases during the negative period of the signal as is apparent from FIG. 4. This signal is supplied through a limiting amplifier B the function of which will be explained below, to a clock oscillator OS, the frequency of which is dependent on the direct voltage obtained. Thus it is the amplitude of the direct voltage obtained from the integrator which determines the frequency of the clock. The average voltage of the signal P13 shown on FIG. 4 is the voltage at which the clock oscillator OS is in synchronism with the clock of the transmitter as it will be explained herebelow.

Section A and section B in FIG. 4 show the synchronizing process. Before the clock signal has been obtained (section A) the clock OS has a rest frequency in correspondence to the rest voltage obtained from the integrator I. This voltage is determined by an average value for the increases and decreases of voltage determined by the frequency of the clock. This appears from the first two periods of the signal P13 during which only the signal P5 is supplied to the integrator I. If now the first synchronizing signal is received, this signal is modulated in the modulator MD whereby the signal P11 is obtained. As $P11=P1 \cdot P5$, the succeeding positive period of P11 will last only so long as both P1 and P5 are positive and becomes considerably shorter than the preceding positive period in the chosen example as the synchronizing pulses have been connected at a time chosen at random. This implies that the increase of the potential of the signal P13 ceases more quickly than during the preceding positive period of P11 and the potential of the signal P13 decreases again during the whole negative period of P11. The next change in the sign of the signal P11 takes place when both P1 and P5 are positive. As it appears this implies that the positive part in P11 is longer than the preceding positive period but is still shorter than the succeeding negative period, so that the decrease of the voltage in P13 is still greater than its increase during the positive period. This process continues, that is, the average voltage level of P13 decreases until the positive period of P11 becomes equal to the negative period. This implies that the clock OS has been brought into synchronism with the incoming clock signals as is evident from section C in FIG. 4.

Section D shows the condition when the clock pulse signal in the transmitter has been phase shift modulated 180° during the duration of two signal elements. The clock pulse signal obtains the shape shown in FIG. 4 and the signal P11 that is obtained from the modulator MD has the shape shown in section D. Hence, the voltage increase of the signal P13 during the positive period of P11, which is twice as long, will be greater than without modulation in the clock pulse channel as it appears from the figure and during the longer negative period the voltage decrease will be greater whereupon the signal P13 reverts to its average value determined by the clock pulse when the modulation of the clock pulse signal ceases.

As is evident a considerable voltage increase occurs in the signal P13 in consequence of the modulation in the clock pulse channel whereby the frequency of the clock OS may be changed to such an extent that it falls out of synchronism. To avoid such falling out of step, a limiting amplifier B is connected between the integration circuit I and the clock OS according to the invention. This amplifier prevents that the voltage of the signal P13 is above or below respectively a predetermined value in reference to the average voltage determined by the clock signals. Hereby it is prevented, as the signals P14 show in FIG. 4, that the frequency of the clock is changed to such a degree that a new synchronizing process is necessary.

In order to regenerate the message signal in the clock signals there is provided a pulse shaper PU which is supplied with the signals P5 and which upon polarity changes in the latter generates the pulses P7. These pulses are fed to a clock pulse sampling means SB and they control it in such a way that the clock pulses are sampled in step with the pulses P7 and the same polarity is obtained at the output of the clock pulse sampling means SB as the clock pulse has at the moment at which it is sampled by means of the pulses P7. The signals P8 are supplied from the clock pulse sampling means SB to a signal detector SD where they are modulated by means of the signals P5 so that the signal $P9=P5 \cdot P8$ is obtained which exactly corresponds to the message signal by means of which the clock pulse signal has been modulated. A signal detector KD is operated by the incoming clock signals and may for example comprise a time circuit the output signal of the detector occurs with such a time delay after the receiving of the clock signal that the synchronization is completed. This output signal is used to connect the limiter B so that it functions when the synchronization has occurred.

An AND-circuit OK produces a signal P9 in dependence on the condition that the synchronization has been carried out.

Alternatively, the limiter B can be controlled also by the signal P9 in such a way that during the occurrence of a phase shift the signal P13 is limited to the O-value as indicated by P14 in FIG. 4. As a result, the clock is not operated during the time for which the phase shift is proceeding, which is acceptable in separate signals but not during a long series of phase shift, as this would cause the clock to fall entirely out of synchronism.

The system according to the invention has great advantages upon appearance of pulse distortion ("jitter") as appears from FIG. 5. The designations used for the signals are the same as in FIG. 4. The difference is that due to the distortion the length of the signals differs from the ideal length by $\delta_1$, $\delta_2$, $\delta_3$. Upon obtaining a message signal in the clock pulse channel the displacement in positive direction of for example the signals P13 may be still greater than upon only phase shift modulation without distortion. By means of the limiter B the variations are held within predetermined limits between $+U_o$ and $-U_o$, so that the message signals in the clock pulse channel are obtained correctly without any disturbance due to the pulse distortion.

I claim:

1. A method of using a clock pulse channel for transmitting message signals in a parallel data transmission system which clock pulse channel normally transmits clock pulses only in order to synchronize a clock device in the transmitter with a clock device in the receiver which latter clock device samples the signal elements in the data transmission signals, characterized thereby that the clock pulse signal is modulated at the transmitter side through a 180° phase shift modulation by a frequency which is half of the clock pulse frequency to obtain on the receiver side a message signal in the form of a clock pulse signal of twice the pulse duration, the incoming clock pulse signal being sensed in order to regenerate the message signal and being modulated by means of a signal generated by the clock device of the receiver, said signal having the same frequency as the normal clock signal but is 90° phase shifted in relation to the same, so that the signal obtained by the modulation changes twice as rapidly as the incoming clock signal, that the signal obtained by the modulation is integrated in order to obtain a direct voltage the value of which increases and decreases respectively in proportion to the length of the positive and the negative signal elements respectively in the signal obtained by means of modulation, and that the integrated signal is supplied to the clock device of the receiver which varies its frequency proportionally to the direct voltage level obtained from the integrator, the voltage of the integrated signal being maintained by means of an amplitude limiter within a predetermined voltage range on both sides of the direct voltage value corresponding to the synchronism of the clock to prevent that the increase and the decrease respectively of the integrated voltage occurring due to the message signal causes the clock to fall out of synchronism.

2. A method according to claim 1, characterized thereby that the amplitude limiter is effective only during the reception of the message signal in the clock pulse channel.

3. A method according to claim 1, characterized thereby that the amplitude limiter is effective the entire time for which reception of clock pulse signals continues, as soon as the synchronization has been carried out.

4. In a data transmission system having a number of channels for message transmission from a transmitter to a receiver and a clock pulse channel for transmitting clock pulses for operating a clock device controlling the sampling of the signal elements received, in synchronism with a clock device in the transmitter, a circuit arrangement for using said clock pulse channel for message transmission, said circuit arrangement including in the transmitter modulating means for modulating the clock pulse signal to be sent, by a 180° phase shift modulation with a frequency which is half of the clock pulse frequency so as to obtain a clock pulse signal of twice the pulse duration representing a message signal, and including in the receiver means for producing by means of the clock device of the receiver a signal which has the same frequency as the received clock pulse signals but is 90° phase shifted relatively to it, means for modulating the received clock pulse signals by said 90° phase shifted signal so as to obtain a signal having twice the frequency of the received clock signal, integrating means supplied by said last mentioned modulating means and producing a direct voltage the value of which increases and decreases respectively proportionally to the length of the positive and the negative signal elements respectively in said modulated signals, said clock device in the receiver having a frequency varying proportionally with the direct voltage level obtained and a definite average direct voltage level corresponding to synchronism with a selected frequency of the clock device of the transmitter, and said clock device being supplied by said direct voltage from said integrating means, and a limiting circuit for maintaining said integrated voltage within a selected voltage range on both sides of said selected average direct voltage in order to prevent the clock device to fall out of synchronism during the increasing and decreasing respectively of said direct voltage during the message signals of twice the length, and furthermore means in the receiver responsive to clock pulse signals of twice the length and producing an output signal depending on such received twice the length signal.

5. A circuit arrangement according to claim 4 comprising means controlled by said 90° phase shifted pulses so as to sample the incoming clock signal pulses and to produce an output corresponding to said signals, and means for modulating said output by means of said 90° phase shifted pulses in consequence of which modulation a signal appears on an output only in the case when there has been a message signal in the clock signal pulses.

6. A circuit arrangement according to claim 4 comprising a signal detector operated by the incoming clock signals and controlling the operation of said limiting circuit, the time delay of said signal detector being such that it prevents the function of said limiting circuit before the synchronizing process is completed.

7. A circuit arrangement according to claim 4 comprising means for activating said limiting circuit only during the receiving of the message signal in the clock pulse channel.

8. A circuit arrangement according to claim 4 comprising means for maintaining said limiting circuit operated when and while clock pulses are received after completion of the synchronization.

References Cited

UNITED STATES PATENTS

| | | | |
|---|---|---|---|
| 2,828,414 | 3/1958 | Rieke | 178—69.5 X |
| 3,200,198 | 8/1965 | McRae | 178—69.5 |
| 3,261,921 | 7/1966 | Hakim et al. | |

ROBERT L. GRIFFIN, Primary Examiner

J. A. BRODSKY, Assistant Examiner

U.S. Cl. X.R.

178—53; 179—15; 325—30